(12) United States Patent
Zhang

(10) Patent No.: US 7,778,219 B2
(45) Date of Patent: Aug. 17, 2010

(54) DIRECTIONAL TRANSMISSION AND RECEPTION IN A MOBILE WIRELESS AD HOC NETWORK

(75) Inventor: Zhensheng Zhang, San Diego, CA (US)

(73) Assignee: San Diego Research Center, Inc., San Diego, CA (US)

( * ) Notice: Subject to any disclaimer, the term of this patent is extended or adjusted under 35 U.S.C. 154(b) by 861 days.

(21) Appl. No.: 11/561,347

(22) Filed: Nov. 17, 2006

(65) Prior Publication Data
US 2007/0280163 A1 Dec. 6, 2007

Related U.S. Application Data

(60) Provisional application No. 60/737,874, filed on Nov. 17, 2005.

(51) Int. Cl.
*H04W 4/00* (2009.01)
(52) U.S. Cl. .................. 370/329; 370/314; 370/330
(58) Field of Classification Search ............... 370/338, 370/329, 332, 334, 336, 337, 341, 347, 348, 370/442, 449, 496, 314, 330, 322
See application file for complete search history.

(56) References Cited

U.S. PATENT DOCUMENTS

| 7,103,371 | B1 * | 9/2006 | Liu ........................ 455/456.4 |
| 7,420,944 | B2 * | 9/2008 | Norris et al. ................ 370/332 |
| 2004/0264495 | A1 * | 12/2004 | Nandagopalan ............. 370/462 |
| 2005/0036505 | A1 * | 2/2005 | Frei et al. ................... 370/442 |
| 2007/0104215 | A1 * | 5/2007 | Wang et al. ................. 370/458 |
| 2008/0247337 | A1 * | 10/2008 | Li et al. ...................... 370/280 |

OTHER PUBLICATIONS

Ali, F.N. et al., Distributed and Adaptive TDMA Algorithms for Multiple-Hop Mobile Networks, IEEE MILCOM 2002 (Oct. 2002), pp. 546-551.
Bao, L. et al., A New Approach to Channel Access Scheduling for ad Hoc Networks, ACM MobiCom. (Jul. 20, 2002), pp. 210-220.

(Continued)

*Primary Examiner*—Jean A Gelin
(74) *Attorney, Agent, or Firm*—Fish & Richardson P.C.

(57) ABSTRACT

Directional transmission and reception in mobile wireless ad hoc networks may include a number of nodes, in which there is at least a first node and a second node. Each node is associated with a time multiplex frame structure having multiple sub-frames. The sub-frames includes at least a first sub-frame, a second sub-frame, and a third sub-frame. Each of the sub-frames includes multiple time slots. The network further includes one or more directional antennas associated with each of the nodes. The first node of the network is configured to establish communication with the second node within one or more time slots corresponding to the first sub-frame in the time multiplex structure. The first node is also configured to reserve one or more time slots for data transmission with the second node within one or more time slots corresponding to the second sub-frame in the time multiplex structure. The first node is further configured to transmit data to the second node based on the one or more reserved time slots corresponding to the third sub-frame in the time multiplex structure. Other embodiments of this aspect include corresponding techniques, apparatus, and computer program products.

20 Claims, 4 Drawing Sheets

OTHER PUBLICATIONS

Bao, L. et al., Transmission Scheduling in Ad Hoc Networks with Directional Antennas, ACM Mob iCom. (Sep. 23-28, 2002), pp. 48-58.

Cain, J. et al., A Link Scheduling and Ad Hoc Networking Approach Using Directional Antennas, IEEE MILCOM (2003), pp. 643-648.

Choudhury, R.R. et al., Using Directional Antennas for Medium Access Control in Ad Hoc Networks (Sep. 2002), pp. 59-70.

Dyberg, K. et al., Antenna Arrays in Spatial reuse TDMA Ad Hoc Networks, ADHOC 02 (Mar. 2002).

Ko, Y.B. et al., Medium Access Control Protocols Using Directional Antennas in Ad Hoc Networks, IEEE (Mar. 2000), pp. 13-21.

Lal, D. et al., A Novel MAC Layer Protocol for Space Division Multiple Access in Wireless Ad Hoc Networks, IEEE (2002), pp. 614-619.

Steenstrup, M.E., Neighbor Discovery among Mobile Nodes Equipped with Smart Antennas, ADHOC (May 2003), pp. 1-6.

Zander, J., Slotted Aloha Multihop Packet Radio Networks With Directional Antennas, Electronics Letters, vol. 26, No. 25 (1990), pp. 2098-2100.

Zhang, Z., Pure Directional Transmission and Reception Algorithms in Wireless Ad Hoc Networks with Directional Antennas, IEEE (2005), pp. 3386-3390.

* cited by examiner

DIRECTIONAL TRANSMISSION AND RECEPTION IN A MOBILE WIRELESS AD HOC NETWORK

PRIOR APPLICATIONS

This application claims priority to U.S. Application Ser. No. 60/737,874, filed on Nov. 17, 2005. The disclosure of the prior application is considered part of (and is incorporated by reference in its entirety) the disclosure of this application.

BACKGROUND

The present disclosure relates to mobile wireless ad hoc networks.

Conventional mobile wireless ad hoc networks often use control and scheduling algorithms (i.e., schedulers), such as medium access control (MAC) schedulers, to determine at what time and to which direction a node should point its antenna and whether it is in transmission mode or receive mode. However, even though directional antennas are generally used for transmission, such wireless ad hoc networks typically use omni-directional reception at certain stages of the scheduler, which can make the network vulnerable to jamming. Moreover, in operation, even if there is one omni-directional communication frame between the transmitter and the receiver, then the directional transmission may be limited by the shorter distance coverage of the omni-directional antennas.

SUMMARY

The present inventor recognized the deficiencies with omni-directional reception and transmission in mobile wireless ad hoc networks. Consequently, the present inventor developed the subject matter, described herein, which, for example, provides control and scheduling techniques for use in a mobile wireless ad hoc network using high-gain, directional antennas for both transmission and reception.

In one aspect, the mobile wireless ad hoc network using high-gain, directional antennas for both transmission and reception includes nodes, in which there is at least a first node and a second node. Each node is associated with a time multiplex frame structure having multiple sub-frames. The sub-frames includes at least a first sub-frame, a second sub-frame, and a third sub-frame. Each of the sub-frames includes multiple time slots. The network further includes one or more directional antennas associated with each of the nodes. The first node of the network is configured to establish communication with the second node within one or more time slots corresponding to the first sub-frame in the time multiplex structure. The first node is also configured to reserve one or more time slots for data transmission with the second node within one or more time slots corresponding to the second sub-frame in the time multiplex structure. The first node is further configured to transmit data to the second node based on the one or more reserved time slots corresponding to the third sub-frame in the time multiplex structure.

In a related aspect, control and scheduling techniques for use in a mobile wireless ad hoc network having nodes using high-gain, directional antennas for both transmission and reception is disclosed. The nodes include at least a first node and a second node configured to operate in a complementary mode. The control and scheduling techniques include dividing a time multiplex frame structure into sub-frames. The sub-frames include at least a first sub-frame, a second sub-frame, and a third sub-frame. Each one of the sub-frames has multiple time slots.

The control and scheduling techniques may further include dividing the time slots corresponding to the first sub-frame and the second sub-frame into mini-slots. The techniques may also include assigning the first sub-frame to correspond to a first time allocation for the first node to discover the second node. The techniques additionally may include assigning the second sub-frame to correspond to a second time allocation for reassuring a connection and making a reservation between the first node and the second node. The techniques also may include assigning the third sub-frame to correspond to a third time allocation for data transmission between the first node and the second node.

One or more features of the techniques described herein may include having the first node perform a three-way handshake during a scan for its neighboring nodes within a mini-slot corresponding to the first sub-frame. Additionally, the step of reassuring a connection between the first node and the second node may occur during at least one of the mini-slots corresponding to the second sub-frame.

In another related aspect, the control and scheduling techniques for use in a mobile wireless ad hoc network having at least a first node and a second node using high-gain, directional antennas for both transmission and reception is disclosed. In this aspect, the first node and the second node are each associated with a directional antenna and a time multiplex frame structure and configured to operate in a complementary mode. Furthermore, the time multiplex frame structure has a first sub-frame, a second sub-frame, and a third sub-frame, and each of the sub-frames includes multiple time slots. The control and scheduling techniques include establishing communication between the first node and the second node within one or more time slots corresponding to the first sub-frame in the time multiplex structure, reserving one or more time slots for data transmission between the first node and the second node within one or more time slots corresponding to the second sub-frame in the time multiplex structure, and transmitting data between the first node and the second node based on the one or more reserved time slots corresponding to the third sub-frame in the time multiplex structure.

The techniques can also include reassuring the communication between the first node and the second node within the one or more time slots corresponding to the second sub-frame in the time multiplex structure. Additionally, establishing communication between the first node and the second node can include determining whether the first node and the second node are operating in a complementary mode. Establishing communication between the first node and the second node can also include configuring the first node for directional transmission and the second node for directional reception when the first node and the second node are operating in the complementary mode. Reserving one or more time slots for data transmission between the first node and the second node can include requesting, by the first node, a number of time slots for data transmission; and determining, by the second node, whether a reservation can be made based on the number of time slots requested.

Control and scheduling techniques can also include sending, by the first node and during the second sub-frame in the time multiplex frame structure, a first message to the second node. The first message may indicate that the first node wants to make a reservation with the second node and requests for a number of available time slots within the third sub-frame in the time multiplex frame structure for data transmission. The second node, in response to receiving the first message, determines whether there is enough available time slots in the third sub-frame to meet the first node's request.

The first node can also reserve, based on availability of time slots, the available time slots in the second node for data transmission. The second node can send a second message to the first node, the second message indicating the reserved time slots and a recommended power level for the directional antenna associated with the first node. The first node can then send, in response to the second message, an acknowledgement and a new recommended power level for a directional antenna associated with the second node. The time multiplex frame structure can be a time division multiple access (TDMA) protocol.

Computer program products, which may be implemented on computer readable-material, are also described. Such computer program products may include executable instructions that cause a computer system to conduct one or more of the method acts described herein. Similarly, computer systems are also described that may include one or more processors and a memory coupled to the one or more processors. The memory may encode one or more programs that cause the one or more processors to perform one or more of the method acts described herein.

These general and specific aspects mentioned above may be implemented using a system, a method, or a computer program, or any combination of systems, methods, and computer programs.

The subject matter described herein may provide one or more of the following advantages. Directional antennas used at both ends of a communication channel (e.g., both transmission and reception) provide a longer transmission range and a higher transmission data rate. They also can reduce signal interferences in unnecessary directions, reduce jamming susceptibility and achieve low probability of detection by limiting the dispersion and detection of energy to desired regions. Also, the additional gain provided by directional transmission and reception can enable communication between distant nodes, thereby reducing the diameter of a wireless ad hoc network. Furthermore, directional antennas increase spatial reuse since it is possible to schedule multiple node-pair transmissions simultaneously. As a result, wireless ad hoc networks equipped with smart directional antennas generally achieve improvements in performance in terms of the quality of service (e.g., end-to-end delay and throughput) provided to individual traffic flows and its ability to thwart jamming and detection by hostile entities.

Furthermore, by using information only from one-hop neighbors to schedule a transmission, a link scheduling, as opposed to node scheduling, can be achieved. For example, a multi-hop link need not be established for data transmission. A transmission schedule for a conflict-free link can be created using only the available slots at the sender and receiver. Slot assignments can be negotiated on demand in a distributive fashion and according to traffic load.

When selecting time slots for reservation, a node can assess slot occupancy and account for its reserved slots. A node can further use information obtained from neighbors' transmissions for which the node is either an intended or an accidental recipient. The beam forming capabilities of smart directional antennas can be utilized to tailor resource access according to the services desired for individual traffic flows, while limiting interference, probability of detection and/or jamming in the network.

Also, the subject matter described herein can make slot reservations on traffic load and dynamically adjust reservations as load changes. Acknowledgements for data packets received can also be provided. A distributed scheduler using local information only can also be implemented to accommodate changes in a node's neighborhood (caused by movement, obstruction or interference) without global recalculation of transmission schedules. Furthermore, with the subject matter described herein, a node need not poll its neighboring nodes with an omni-directional ready to receive (RTR) message that contains the node's training sequence, which indicates the directions in which a node accepts transmissions.

Other aspects, features, and advantages will become apparent from the following detailed description, the drawings, and the claims.

BRIEF DESCRIPTION OF THE DRAWINGS

Like reference numbers and designations in the various drawings indicate like elements.

DETAILED DESCRIPTION

Figure 1:
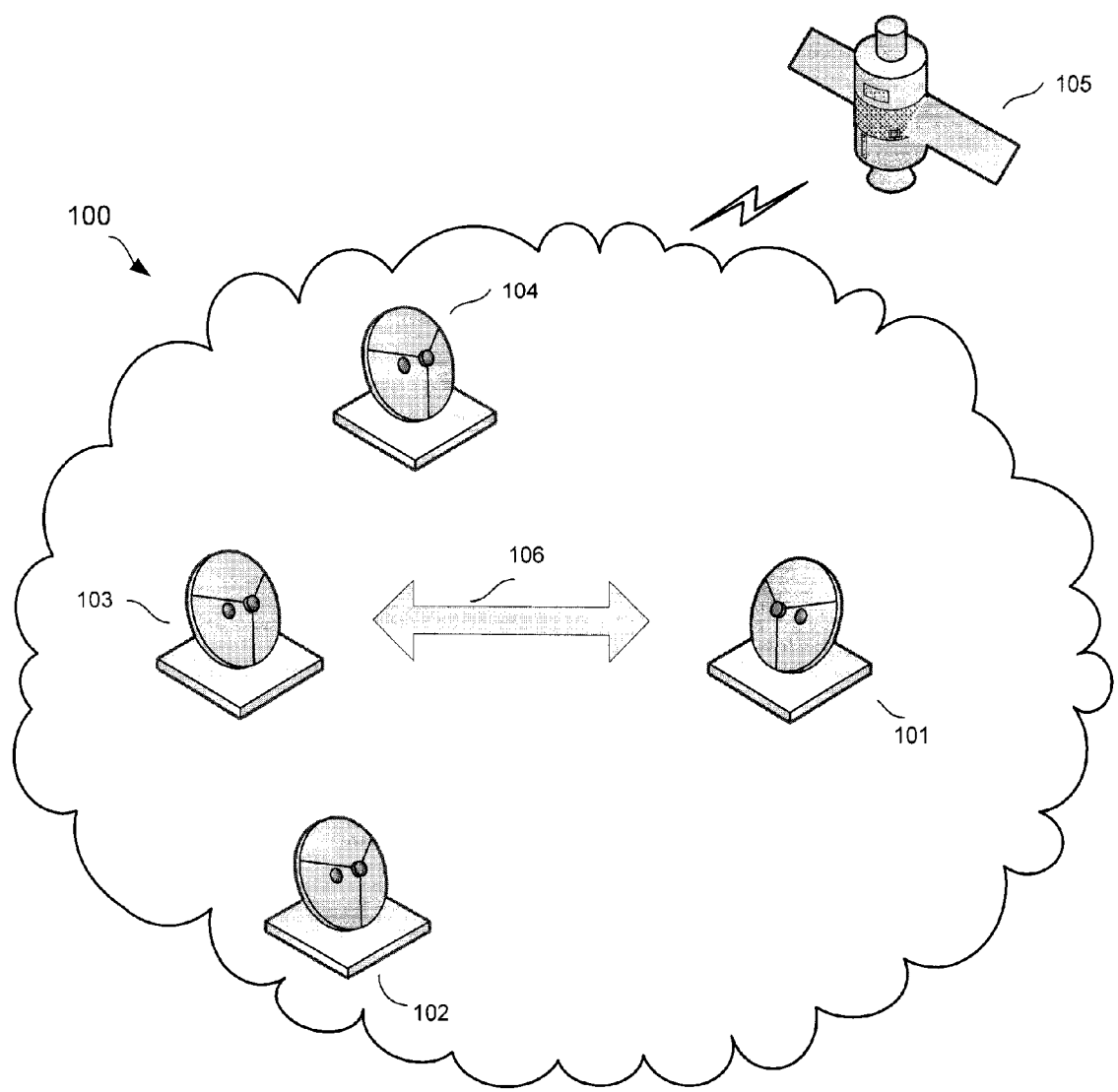
FIG. 1 illustrates a directional transmission and reception mobile wireless ad hoc network.

FIG. 1 illustrates a directional transmission and reception mobile wireless ad hoc network upon which the techniques described herein may be used. Here, mobile wireless ad hoc network 100 includes nodes 101, 102, 103, 104. Generally, a mobile wireless ad hoc network 100 will include numerous nodes, the number of which depends on the network design requirements. The number and location of nodes in a mobile wireless ad hoc network can also change based on network conditions (e.g., on a battlefield). But for exemplary purposes, four nodes are provided. Each node 101, 102, 103, 104 includes a steerable directional antenna for directional transmission and reception in the wireless ad hoc network 100. All nodes are synchronized in timing, for example, by using the global positioning system (GPS) 105.

Additionally, nodes 101, 102, 103, 104 are all neighboring nodes because they are within each other's transmission and reception range. Further, the nodes 101, 102, 103, 104 are one-hop neighboring nodes because they are capable of communicating directly with each other without going through an intermediary node. Each node 101, 102, 103, 104 can also communicate in half-duplex mode by rapidly switching between transmitting and receiving modes. Each node 101, 102, 103, 104 can further move from one location to another within the mobile wireless ad hoc network 100. Moreover, each node 101, 102, 103, 104 can form a single transmit or receive beam of arbitrary width $\omega$, ($\omega<\pi$) radians, and steer the beam in an arbitrary direction. Thus, each node 101, 102, 103, 104 has the ability to transmit and receive directionally.

Figure 2:
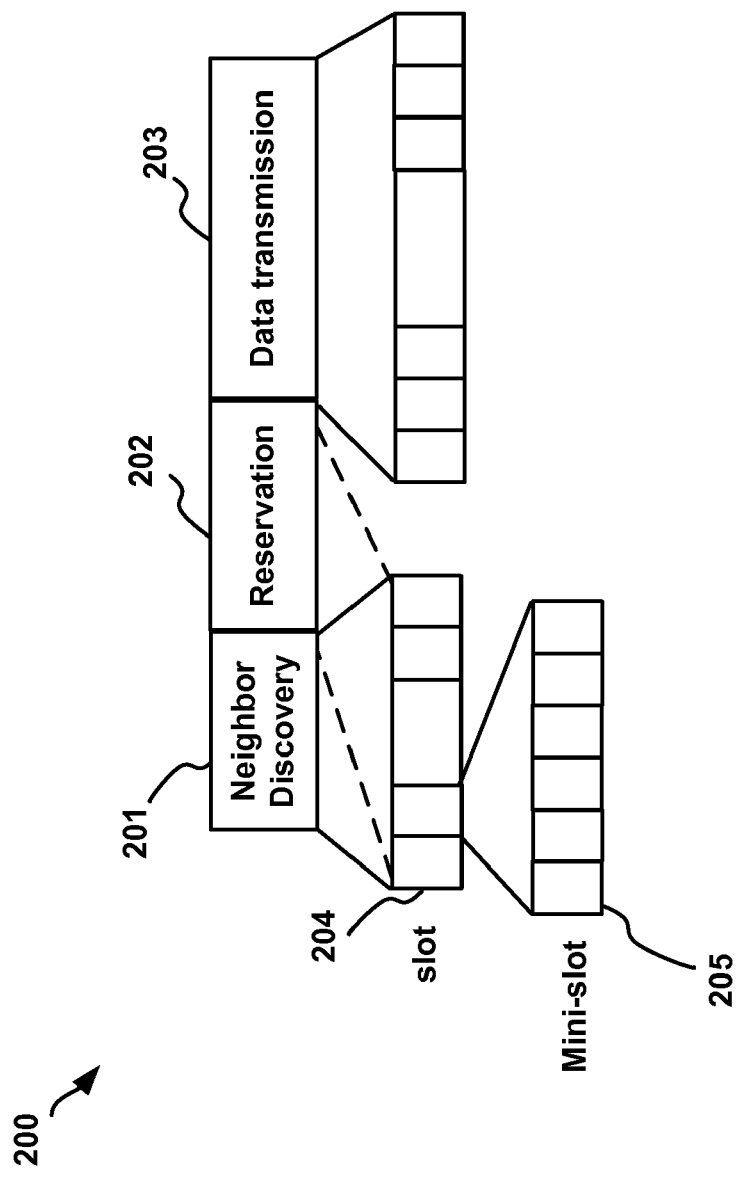
FIG. 2 illustrates a TDMA-based frame structure configured for directional transmission and reception.

FIG. 2 illustrates a TDMA-based frame structure configured for directional transmission and reception. Generally, in a TDMA communication system, time can be divided into a number of frames. As shown in FIG. 2, these frames are represented by a TDMA-based frame structure 200. The TDMA-based frame structure 200 is divided into three sub-frames 201, 202, 203. Each sub-frame 201, 202, 203 corresponds to a specified function in a link scheduling process.

The first sub-frame 201 is used for neighbor discovery by detecting new nodes or nodes that have moved. Sub-frame 201 can also be used to discover a neighboring node that is operating in a complementary mode (i.e., one node in transmitting mode and the other node being in receiving mode). The second sub-frame 202 is used by two nodes that are in a complementary mode to revisit each other after the initial discovery during neighbor discovery sub-frame 201, and to make a reservation for data transmission between the two nodes. The third sub-frame 203 is used for data transmission between the two nodes that have made a reservation during sub-frame 202 to transmit data.

Each sub-frame 201, 202, 203 is divided into one or more time slots 204. Because a TDMA-based message frame structure is used, the time slot 204 is a portion of time allocated to each TDMA frame. For example, a typical wireless ad hoc network can assign one second to a TDMA frame and the frame can then be divided into one hundred time slots, each time slot corresponding to ten milli-seconds.

Each time slot 204 within the sub-frames 201, 202, 203 corresponding to neighbor discovery and the revisit and reservation period is further divided into multiple mini-slots 205. For example, if each time slot corresponds to ten milli-seconds, then each time slot can be further divided into ten mini-slots of one milli-second per mini-slot. Each mini-slot 205 can be assigned a different function. For example, each one of the mini-slots for the neighbor discovery sub-frame 201 can be used to perform a three-way handshake during a scan for neighboring nodes. Further, each one of the mini-slots for the revisit/reservation sub-frame 202 can be allocated for two nodes to revisit each other and make a reservation for data transmission.

In both the neighbor discovery sub-frame 201 and revisit/reservation sub-frame 202, a three-way handshaking process is used for power level negotiation and reservation confirmation. The content of the three-way messages used in the handshaking process for neighbor discovery can be different from that used in for reservation. However, for ease of implementation, the same message format can be used in both cases (neighbor discovery and making reservation). The message length used for making reservation can be longer than that used for neighbor discovery.

Each mini-slot 205 can accommodate three-way handshaking messages used in both the neighbor discovery and reservation. In other implementations, there are n mini-slots in the first sub-frame and r mini-slots in the second sub-frame. The values of n and r can be different and can be configured during network configuration. With this implementation, 15% of the available time slots in a given TDMA frame can be allocated for both the neighbor discovery and the revisit/reservation functions, and an 85% data throughput can be achieved.

Figure 3A:
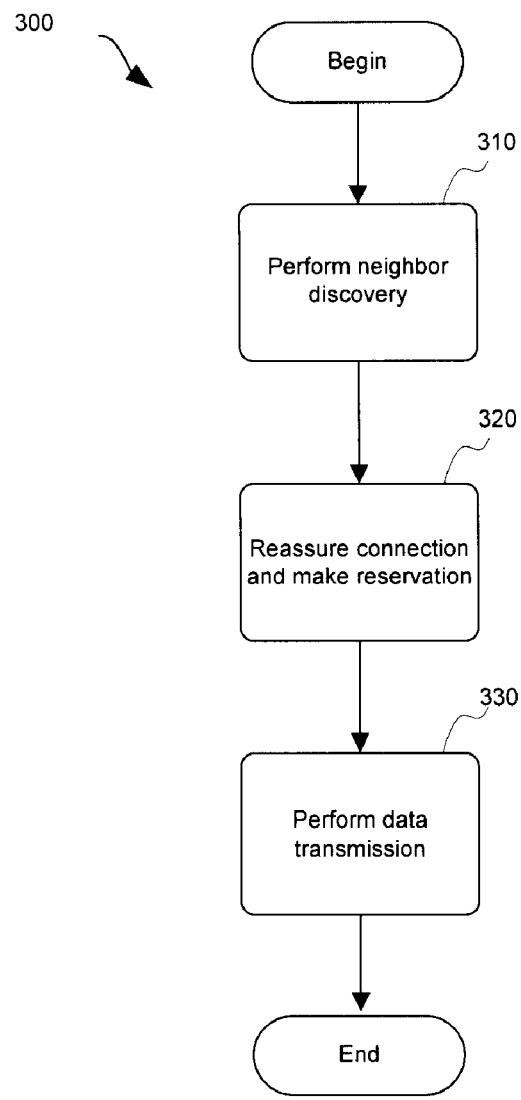
FIG. 3A is a flow chart describing a scheduler technique for use in the directional transmission and reception mobile wireless ad hoc network.

FIG. 3A is a flow chart describing a scheduler technique for use in the directional transmission and reception mobile wireless ad hoc network. Here, the scheduler technique 300 includes a neighbor discovery process 310, a reassure and reservation process 320 and a data transmission process 330. The neighbor discovery process 310 occurs in the first sub-frame of the TDMA frame structure, e.g., as previously shown by sub-frame 201 in FIG. 2.

Figure 3C:
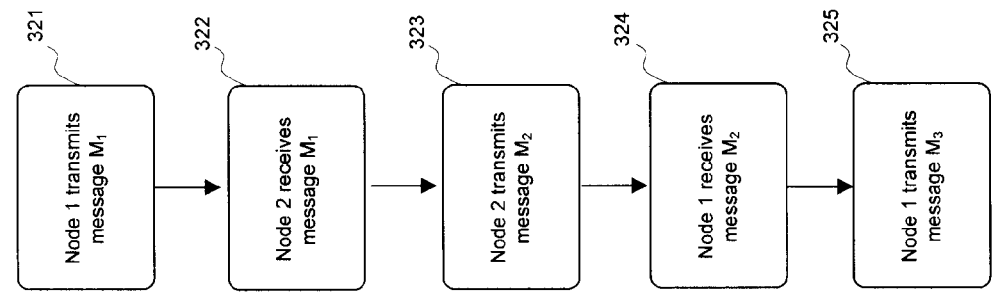
FIG. 3C is a flow chart describing a revisit and reservation technique of the scheduler.
Figure 3B:
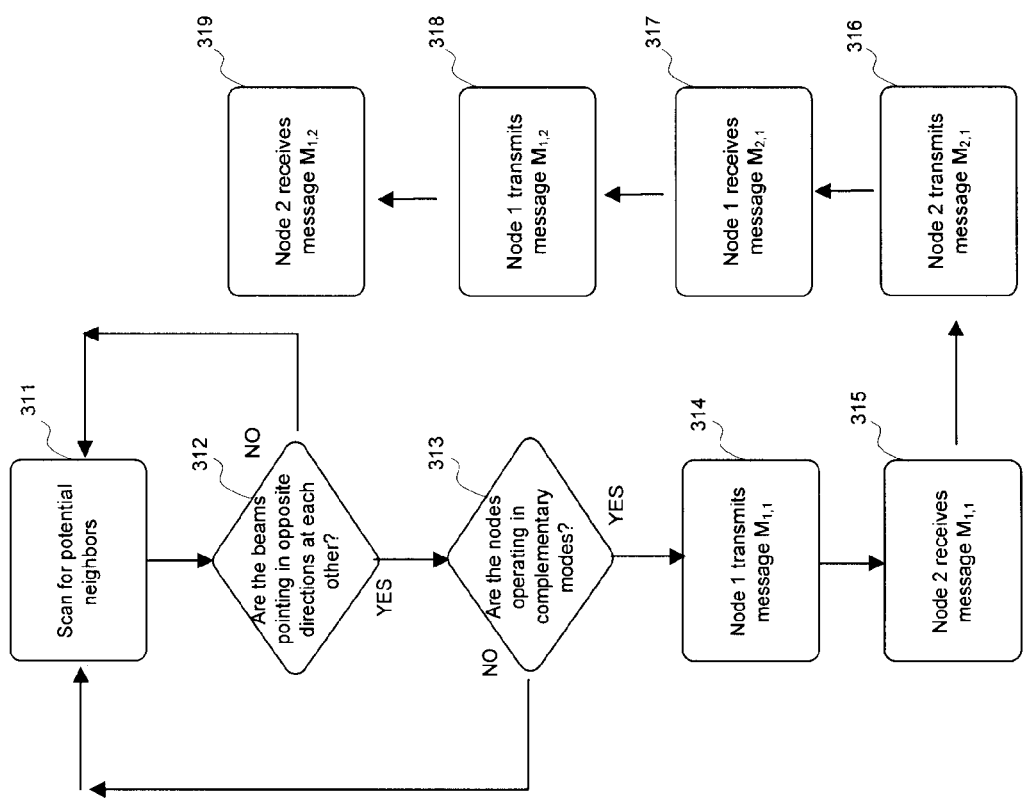
FIG. 3B is a flow chart describing a neighbor discovery technique of the scheduler.

FIG. 3B is a flow chart describing in detail the neighbor discovery process 310 of the scheduler technique 300. Here, at 311, a node (e.g., Node 1) scans for its potential neighbors in the wireless ad hoc network. A scan can be defined as a sequence of antenna-pointing directions and modes, that induces a minimal covering of the entire search volume by caps formed by the intersection of the volume (e.g., a hemisphere) and the beams of width $\omega$, centered over each of the pointing directions. Within each scan, nodes follow a predefined sequence, possibly in opposite polarities. When scanning, a node transmits an advertisement in each specified direction. When listening, a node waits for advertisements.

The node (e.g., Node 1) may detect all of its potential neighbors within a single scan of the sequence of directions; however, it can typically take multiple scans to find neighboring nodes. The lower and upper limits on the number of scans necessary for all nodes in the network to discover all of their potential neighbors can depend on the characteristics of the achievable network graph and the process the node uses to select its mode (e.g., scanning or listening) for each scan.

Next, at 312, a determination is made whether the beams of the node (Node 1) and a neighboring node (e.g., Node 2) are pointing at each other in opposite directions. That is, in order to establish communication between two arbitrary nodes in a mobile wireless ad hoc network using directional transmission and reception, the two nodes need to point their beams at each other at the same time For example, with reference to FIG. 1, a pair of one-hop neighboring nodes 101, 103 with directional antennas can establish communication when a straight line 106 connecting them is contained within both the current transmit beam of node 101 and the current receive beam of the node 103.

Thus, at 312, if it is determined that the node (Node 1) and the neighboring node (Node 2) are not pointing at each other in opposite directions then the process returns to step 311; otherwise the process continues to step 313. At 313, a determination is made as to whether the node (Node 1) and the neighboring node (Node 2) are operating in a complementary transmit/receive mode (i.e., one node needs to be transmitting and the other receiving). If the two nodes are not operating in a complementary node, the process returns to step 311; otherwise the process continues to step 314 in which the node (Node 1) transmits its message.

But generally, in a tactical network, communications of messages can likely take place in three dimensions. Not only can there be communications of messages between terrestrial and airborne nodes, but there can also be communications of messages between terrestrial nodes located at various elevations and among airborne nodes flying at different altitudes. In order to formalize this condition, let $(\theta', \phi')$ and $(\theta'', \phi'')$ be the respective transmit and receive directions of two nodes (e.g., Node 1 and Node 2). For narrow-beam directional antennas, communication between the two nodes can require that the two beams point in opposite directions, and be in complementary transmit/receive modes; that is:

$$\theta'=(\theta''+\pi) \bmod 2\pi \text{ and } \phi'=((\phi''+\pi) \bmod 2\pi \quad (1)$$

An effective neighbor discovery process can be achieved by performing a search consistent with the constraints of equation (1).

If a listening node receives an advertisement, it responds directionally with its own advertisement and expects to receive an acknowledgement in return, all within a short time interval. Each portion of the three-way handshake can be used to exchange transmit power level information and refine directional information. An exemplary three-way handshaking process is presented below in further detail.

A deterministic mode selection algorithm can be used. Each node can be initialized with parameters N and j, where $j \in \{0, \ldots, N-1\}$ (its unique identifier) and N can be the maximum number of nodes in the network. Each node's ID, j, can be coded into a binary form. If the number of digits is less than $\lceil \log_2 N \rceil$, 0's are added to the left up to $\lceil \log_2 N \rceil$ digits. For example, if N=16, and j=3, its binary form is 0011.

For scan i, if the ith digit is 0, it chooses listening mode and if it is 1, it chooses scan mode. Thus, during the first scan, a node has the opportunity of detecting one-half of its neighbors in the network (if they are within the reachable range of the directional antennas). Thus, for any two nodes, there can be at least one different digit in their binary code, which in turn implies that the two nodes can be detected by each other in at most [$\log_2 N$] scans if they are within the reachable range.

In addition to detecting a neighboring node, a node (Node 1) in the wireless ad hoc network initiates a three-way handshake with its neighboring node (Node 2). The three-way handshaking process can include actions taken by, and the messages exchanged between, each node at each pointing direction during the neighbor discovery process 310 or the revisit/reservation process 320. The message contents discussed below are those that relate specifically to the neighbor discovery three-way handshaking process.

First, at 314, Node 1 transmits message $M_{1,1}$ advertising itself to all potential neighbors at transmit power level $trn_{1,1} = trn_{max}$, which is Node 1's maximum transmit power level. The maximum transmit power level can be used to maximize Node 1's chances of discovering any potential neighbors within range of its directional antenna. Thus, $M_{1,1}$ contains Node 1's identifier and its transmit power level, $trn_{1,1}$.

When Node 1 transmits message $M_{1,1}$, Node 2 can be listening for a transmission. If none is received, Node 2 abandons the handshake. Otherwise, at 315, Node 2 successfully receives $M_{1,1}$, and it knows that Node 1 exists. Thus, Node 2 can then advertise itself to Node 1 depending upon the level of the received signal power, $rcv_{1,1}$, measured by Node 2.

If $rcv_{1,1} < rcv_{min}$ (minimum receive signal power) or $rcv_{1,1} > rcv_{max}$ (maximum receive signal power), Node 2 computes a recommended power level for Node 1's transmit power level, $trn_1$. If $trn_1 > trn_{max}$, Node 2 assumes that it cannot form a neighbor relationship with Node 1 and abandons the handshake, but if $trn_1 < trn_{max}$, Node 2 proceeds with the handshake. Upon identifying Node 1 as a potential neighbor, Node 2 begins the process of establishing future rendezvous times at which both nodes can reassess their neighbor relationship and make a reservation.

There can be two cases that may occur at this point. In a first case, Nodes 1 and 2 had detected each other at a prior time and had already agreed to revisit each other and make reservation at a future time. In a second case, Nodes 1 and 2 had never detected each other before or had detected each other before but were unable to agree to a time to revisit each other and make a reservation for data transmission. Node 2 will indicate whether it is case 1 or case 2 in the agreed/not agreed field of its transmitted message. Next, at 316, Node 2 transmits message $M_{2,1}$ to Node 1 at transmission power level $trn_1$. $M_{2,1}$ can include Node 2's identifier, Node 1's identifier, $trn_1$, a field for agreed/not agreed, and $N\_free_2$.

$N\_free_2$ can be a bit vector whose dimension is m*r, where m is the number of sub-frames from which the reservation can be made, r is the number of mini-slots in the second sub-frame. In order to guarantee a slot is available, m*r should be greater than or equal to $2N_d - 1$, where $N_d$ is the maximum number of neighbors a node can have in the network. If the value of the element in the vector is 1, that particular mini-slot (in a corresponding sub-frame) can be a candidate. If the value is 0, that mini-slot is not available. If the value is case 1, $N\_free_2$ is the set of slots reserved previously if Node 2 decides to respond. If the value is case 2, $N\_free_2$ is the vector indicating Node 2's available mini-slots for reservation.

Once Node 1 transmits message $M_{1,1}$ Node 1 listens for a return transmission. If none is received, Node 1 abandons the handshake. Otherwise, at 317, Node 1 successfully receives $M_{2,1}$ and it knows that Node 2 exists and may continue the handshake, depending upon the level of the received signal power similar to what has been described above.

In case 1, Node 1 agrees to their previous agreement and confirms with Node 2 about the time slots when they will make reservation in N_free_com. In case 2, Node 1 computes the set of selected rendezvous times, N_free_com, by first computing the common time slots of $N\_free_1$ and $N\_free_2$, where N_free_represents the available slots from Node 1. If there are multiple common mini-slots, a predetermined allocation rule can be used. For example, slot allocation can include choosing the left-most slot first or the right-most slot first.

In the worst case, Nodes 1 and 2 share no common available mini-slots, Node 1 abandons the handshake with Node 2. If N_free_com contains at least one 1, Node 1 proceeds with the handshake and responds to Node 2. At 318, Node 1 transmits message $M_{1,2}$ to Node 2 at transmit power level $trn_2$. $M_{1,2}$ can include Node 1's identifier, Node 2's identifier, $trn_2$, and N_free_com.

Node 2 listens for a response from Node 1. If none is received, Node 2 assumes Node 1 cannot agree to have a connection. Otherwise, at 319, Node 2 successfully receives message $M_{1,2}$, and it knows that Node 1 confirms the reservation. It can also be agreed that Node 1 starts the reservation process. The agreed mini-slots for reservation between two nodes is valid until the time when the two nodes detect each other again. At that time, they have the option to keep using the agreed mini-slot or select a different mini-slot.

FIG. 3C is a flow chart describing the reassure and reservation technique of the scheduler. As described above, during the neighbor discovery process 310, Nodes 1 and 2 detected each other and agreed to a future time slot at which the two nodes would revisit each other to reassure the connection and see if they can make any reservations. Reassure and reservation can be made at the second sub-frame of the TDMA frame structure 200, e.g., sub-frame 202 as shown in FIG. 2.

At 321, Node 1 starts the three-way handshaking by transmitting message $M_1$ to indicate its available slots and whether it wants to make a reservation with Node 2. However, at the time the two nodes agreed to revisit each other and reassure their connectivity, they can also agree that Node 2 (instead of Node 1) will initiate the three-way handshaking process. Message $M_1$ can include Node 1's identifier, Node 2's identifier, $trn_1$, a field for Reservation/No reservation, k (minimum number of slots required), and $R\_free_1$. As mentioned before, $trn_1$ is the transmission power used by Node 1. Node 1 can use the Reservation/No reservation bit to indicate whether it desires to make a reservation. $R\_free_1$ can represent a set of available slots within the frame (or over a fixed number of frames) for reservation.

When re-detecting each other and making reservations, Nodes 1 and 2 can simply point each other at the direction agreed-to during the neighbor discovery process 310 at the agreed mini-slot. If Nodes 1 and 2 cannot find each other at that direction (e.g., because one of the nodes has moved away), they have to wait until their next agreed-upon mini-slot in the following TDMA frames or the neighbor discovery time to re-discover each other.

Each node in the wireless ad hoc network maintains a special scanning sequence, including a set of directions starting in a particular direction and spiraling outward counter-clockwise to cover a pre-defined angle. If they cannot find each other after the maximum number of searches in the spiraling scan, then they have to wait until their next agreed mini-slot in the following frames, or until the time allocated for neighbor discovery. This technique can enable the two nodes to quickly detect each other, provided that they have not moved a large angular distance relative to each other since their last contact.

Furthermore, at 321, Node 1 can indicate in message $M_1$ that it wants to make reservation and request the number of time slots desired in the data transmission sub-frame. At 322, Node 2 receives message $M_1$. After which, Node 2 computes the power level received from Node 1 and a set of free time slots, which are common to both nodes. If the number of common slots is less than required, no reservation can be made, but Nodes 1 and 2 can keep the last direction they contacted each other and may continue in the next agreed mini-slot in the following frames.

At 323, Node 2 replies with message $M_2$ if the number of available common slots for both nodes is equal to (or greater than) that required by Node 1. Message $M_2$ can include a newly computed power level, $trn_2$, and the set of common slots reserved for data transmission, R_free_com. Message $M_2$ can further include Node 1's identifier, Node 2's identifier, a field for Reservation/No reservation, and k (minimum number of slots required).

At 324, Node 1 receives the reply message $M_2$. At 325, Node 1 acknowledges to Node 2 with message $M_3$, which can include a newly computed power level, $trn_3$. Message $M_3$ can further include Node 1's identifier and Node 2's identifier. Furthermore, Nodes 1 and 2 can then exchange data at the reserved time slot in the data transmission sub-frame of the TDMA frame structure.

After Node 1 sends message $M_1$ at 321, there can be a case where Node 1 does not want to make the reservation, but Node 2 does. In which case, Node 1 indicates that it does not have any desire to make a reservation but also indicates its available slots in case Node 2 would like to make the reservation. Node 2 computes the common available slots and replies to Node 1 based on the following cases. If the number of common slots available for both nodes is less than Node 2 needed, Node 2 abandons the reservation, but the two nodes keep the last direction they contacted each other and may continue in the next agreed mini-slot in the following frames. If the number of common slots available is within the acceptable range, Node 2 confirms the reservation by sending the set of slots reserved, R_free_com. Node 2 also computes a new power level for Node 1 to use. Node 1 sends back an acknowledgment.

Additionally, after Node 1 sends message $M_1$ at 321, there can be another case where neither Node 1 nor Node 2 wants to make a reservation for data transmission. In which case, Node 1 indicates that it does not have any desire to make a reservation, but can also indicate its available time slots (as Node 1 does not know yet if Node 2 wants to make reservation). Node 2 replies with no reservation desired, but the two nodes can agree to keep the last direction they contacted each other and continue in the next agreed mini-slot. Node 1 also sends back an acknowledgement to confirm.

While specifics of the subject matter have been described these should not be construed as limitations on the scope of the invention or of what may be claimed, but rather as descriptions of features specific to particular implementations. Certain features that are described herein in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Likewise, although a few variations have been described in detail above, other modifications are possible. For example, the steps of the processes and techniques described herein can be performed in a different order and still achieve desirable results Accordingly, other implementations are within the scope of the following claims.

What is claimed is:

1. A method of configuring a time multiplex frame structure for directional transmission and reception in a mobile wireless ad hoc network comprising a plurality of nodes including at least a first node and a second node configured to operate in a complementary mode, the method comprising:

dividing the time multiplex frame structure into a plurality of sub-frames including at least a first sub-frame, a second sub-frame, and a third sub-frame, wherein each one of the plurality of sub-frames has a plurality of time slots;

dividing the plurality of time slots corresponding to the first sub-frame and the second sub-frame into a plurality of mini-slots;

assigning the first sub-frame to correspond to a first time allocation for the first node to discover the second node;

assigning the second sub-frame to correspond to a second time allocation for reassuring a connection and making a reservation between the first node and the second node; and assigning the third sub-frame to correspond to a third time allocation for data transmission between the first node and the second node.

2. The method of claim 1, wherein the number of mini-slots associated with the first sub-frame is different than the number of mini-slots associated with the second sub-frame.

3. The method of claim 1, wherein assigning the first sub-frame to correspond to a first time allocation comprises assigning at least one mini-slot corresponding to the first sub-frame to a time allocation for the first node to discover one of the plurality of nodes different than the second node.

4. The method of claim 1, wherein at least one mini-slot corresponding to the second sub-frame is reserved based on a three-way handshake between the first node and the second node during the first sub-frame.

5. The method of claim 1, wherein at least one time slot corresponding to the third sub-frame is reserved for data transmission based on a three-way handshake between the first node and the second node during the second sub-frame.

6. The method of claim 1, wherein at least one mini-slot corresponding to the first sub-frame is configured to accommodate a three-way handshake between the first node and the second node.

7. The method of claim 1, wherein at least one mini-slot corresponding to the second sub-frame is configured to accommodate a three-way handshake between the first node and the second node for reassuring a connection between the first node and the second node.

8. The method of claim 1, wherein the time multiplex frame structure comprises a time division multiple access protocol.

9. A method of communicating in a directional transmission and reception mobile wireless ad hoc network comprising at least a first node and a second node, wherein the first node and the second node are each associated with a directional antenna and a time multiplex frame structure, wherein the time multiplex frame structure has a first sub-frame, a second sub-frame, and a third sub-frame, each of the sub-frames including a plurality of time slots, further wherein first node and second node are configured to operate in a complementary mode, the method comprising:
   establishing communication between the first node and the second node within one or more time slots corresponding to the first sub-frame in the time multiplex structure;
   reserving one or more time slots for data transmission between the first node and the second node within one or more time slots corresponding to the second sub-frame in the time multiplex structure; and
   transmitting data between the first node and the second node based on the one or more reserved time slots corresponding to the third sub-frame in the time multiplex structure.

10. The method of claim 9, further comprising reassuring the communication between the first node and the second node within the one or more time slot corresponding to the second sub-frame in the time multiplex structure.

11. The method of claim 9, wherein establishing communication between the first node and the second node comprises:
   determining whether the first node and the second node are operating in a complementary mode; and
   configuring the first node for directional transmission and the second node for directional reception when the first node and the second node are operating in the complementary mode.

12. The method of claim 9, wherein reserving one or more time slots for data transmission between the first node and the second node comprises:
   requesting, by the first node, a number of time slots for data transmission; and
   determining, by the second node, whether a reservation can be made based on the number of time slots requested.

13. The method of claim 9, further comprising:
   sending, by the first node and during the second sub-frame in the time multiplex frame structure, a first message to the second node, the first message indicating that the first node wants to make a reservation with the second node and requesting for a number of available time slots within the third sub-frame for data transmission; and
   determining, by the second node in response to receiving the first message, whether there is enough available time slots in the third sub-frame to meet the first node's request.

14. The method of claim 13, further comprising:
   reserving, by the first node and based on availability of time slots, the available time slots in the second node for data transmission; and
   sending, by the second node, a second message to the first node, the second message indicating the reserved time slots and a recommended power level for the directional antenna associated with the first node.

15. The method of claim 14, further comprising:
   sending, by the first node and in response to the second message, an acknowledgement and a new recommended power level for a directional antenna associated with the second node.

16. The method of claim 9, wherein the time multiplex frame structure comprises a time division multiple access protocol.

17. A system for directional transmission and reception in a mobile wireless ad hoc network, the system comprising:
   a plurality of nodes including at least a first node and a second node, each node associated with a time multiplex frame structure having a plurality of sub-frames, the plurality of sub-frames including at least a first sub-frame, a second sub-frame, and a third sub-frame, each of the sub-frames including a plurality of time slots; and
   a plurality of directional antennas associated with each of the plurality of nodes, wherein the first node is configured to:
   establish communication with the second node within one or more time slots corresponding to the first sub-frame in the time multiplex structure;
   reserve one or more time slots for data transmission with the second node within one or more time slots corresponding to the second sub-frame in the time multiplex structure; and
   transmit data to the second node based on the one or more reserved time slots corresponding to the third sub-frame in the time multiplex structure.

18. The system of claim 17, wherein the plurality of time slots associated with the first sub-frame and the second sub-frame each comprise a plurality of mini-slots.

19. The system of claim 18, wherein the number of mini-slots associated with the first sub-frame is different than the number of mini-slots associated with the second sub-frame.

20. The system of claim 17, wherein the time multiplex frame structure comprises a time division multiple access protocol.

* * * * *